(12) United States Patent
Clason et al.

(10) Patent No.: US 10,619,780 B2
(45) Date of Patent: *Apr. 14, 2020

(54) SINGLE ACTION PUSH TO CONNECT CONDUIT FITTING

(71) Applicant: Swagelok Company, Solon, OH (US)

(72) Inventors: Mark A. Clason, Orwell, OH (US); Peter C. Williams, Cleveland Heights, OH (US); Cal R. Brown, Lyndhurst, OH (US); Ronald P. Campbell, Shaker Heights, OH (US); Douglas S. Welch, Chesterland, OH (US); Douglas J. McClure, Mentor, OH (US)

(73) Assignee: Swagelok Company, Solon, OH (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/866,617

(22) Filed: Jan. 10, 2018

(65) Prior Publication Data

US 2018/0128405 A1    May 10, 2018

Related U.S. Application Data

(63) Continuation of application No. 14/520,616, filed on Oct. 22, 2014, now Pat. No. 9,903,518.

(Continued)

(51) Int. Cl.
*F16L 37/092* (2006.01)
*F16L 37/23* (2006.01)

(52) U.S. Cl.
CPC ............. *F16L 37/23* (2013.01); *F16L 37/092* (2013.01); *F16L 37/0927* (2019.08)

(58) Field of Classification Search
CPC ......... F16L 37/22; F16L 37/23; F16L 37/086; F16L 37/092; F16L 37/0927
(Continued)

(56) References Cited

U.S. PATENT DOCUMENTS 1,337,288 A    4/1920  Stichler
2,062,628 A  * 12/1936  Yannetta ............... F16B 7/1409
                                                      403/365

(Continued)

FOREIGN PATENT DOCUMENTS

CN    101162068    4/2008
CN    102203491    9/2011

(Continued)

OTHER PUBLICATIONS

Search Report from European Application No. 18185089.2 dated Nov. 27, 2018.

(Continued)

*Primary Examiner* — Aaron M Dunwoody
(74) *Attorney, Agent, or Firm* — Calfee, Halter & Griswold LLP

(57) ABSTRACT

A single action push to connect fitting for conduit such as tube or pipe. The fitting includes a first fitting component and a second fitting component that are joined or assembled together to form a fitting assembly. The fitting assembly includes a conduit seal device and a conduit retaining device. A conduit may be manually or otherwise inserted into the assembled fitting assembly with a single axial movement and be retained and sealed without need for further action or movement of the fitting components.

20 Claims, 8 Drawing Sheets

Related U.S. Application Data

(60) Provisional application No. 61/895,043, filed on Oct. 24, 2013.

(58) Field of Classification Search
USPC ........ 285/246, 244, 316, 317, 308, 309, 310
See application file for complete search history.

(56) References Cited

U.S. PATENT DOCUMENTS

| | | |
|---|---|---|
| 2,429,202 A | 10/1947 | Estill et al. |
| 2,561,887 A | 7/1951 | Risley |
| 2,702,202 A | 2/1955 | Kaiser |
| 2,848,135 A | 8/1958 | Rickard et al. |
| 2,914,344 A | 11/1959 | Anthes |
| 3,398,977 A | 8/1968 | Yoneda |
| 3,453,005 A | 7/1969 | Foults |
| 3,773,360 A | 11/1973 | Timbers |
| 3,887,222 A | 6/1975 | Hammond |
| 4,055,359 A | 10/1977 | McWethy |
| 4,082,696 A | 4/1978 | Robinson |
| 4,105,226 A | 8/1978 | Frey |
| 4,111,464 A | 9/1978 | Asano et al. |
| 4,135,745 A | 1/1979 | Dehar |
| 4,163,573 A | 8/1979 | Yano |
| 4,191,408 A | 3/1980 | Acker |
| 4,193,616 A | 3/1980 | Sarson et al. |
| 4,240,654 A | 12/1980 | Gladieux |
| 4,298,220 A | 11/1981 | Kukuminato |
| 4,304,422 A | 12/1981 | Schwarz |
| 4,311,328 A | 1/1982 | Truchet |
| 4,401,326 A | 8/1983 | Blair |
| 4,455,177 A | 6/1984 | Filippov et al. |
| 4,540,201 A | 9/1985 | Richardson |
| 4,645,245 A | 2/1987 | Cunningham |
| 4,685,706 A | 8/1987 | Kowal et al. |
| 4,703,958 A | 11/1987 | Fremy |
| 4,719,971 A | 1/1988 | Owens |
| 4,750,765 A | 6/1988 | Cassidy et al. |
| 4,752,088 A | 6/1988 | Stahl et al. |
| 4,793,637 A | 12/1988 | Laipply et al. |
| 4,813,716 A | 3/1989 | Lalikos et al. |
| 4,834,423 A | 5/1989 | DeLand |
| 4,872,710 A | 10/1989 | Konecny et al. |
| 4,893,810 A | 1/1990 | Lee |
| 4,906,031 A | 3/1990 | Vyse |
| 4,923,228 A | 5/1990 | Laipply |
| 5,005,877 A | 4/1991 | Hayman |
| 5,022,687 A | 6/1991 | Ariga |
| 5,024,468 A | 6/1991 | Burge |
| 5,042,848 A | 8/1991 | Shiozaki |
| 5,044,401 A | 9/1991 | Giesler et al. |
| 5,044,672 A | 9/1991 | Skeels |
| 5,076,541 A | 12/1991 | Daghe et al. |
| 5,118,140 A | 6/1992 | Racine |
| 5,176,409 A | 1/1993 | Brooks |
| 5,181,751 A | 1/1993 | Kitamura |
| 5,226,682 A | 7/1993 | Marrison et al. |
| 5,246,236 A | 9/1993 | Szarka |
| 5,284,369 A | 2/1994 | Kitamura |
| 5,301,408 A | 4/1994 | Berman et al. |
| 5,401,065 A | 3/1995 | Okumura et al. |
| 5,474,336 A | 12/1995 | Hoff et al. |
| 5,553,895 A | 9/1996 | Karl et al. |
| 5,562,371 A | 10/1996 | Reed |
| 5,566,987 A | 10/1996 | Mazhar |
| 5,570,910 A | 11/1996 | Highlen |
| 5,632,651 A | 5/1997 | Szegda |
| 5,653,480 A | 8/1997 | Mine |
| 5,662,359 A | 9/1997 | Kargula |
| 5,681,061 A | 10/1997 | Olson |
| 5,683,120 A | 11/1997 | Brock |
| 5,685,575 A | 11/1997 | Allread et al. |
| 5,967,477 A | 10/1999 | Walmsley |
| 6,056,327 A | 5/2000 | Bouldin |
| 6,073,976 A | 6/2000 | Schmidt et al. |
| 6,152,496 A | 11/2000 | Kouda |
| 6,186,557 B1 | 2/2001 | Funk |
| 6,334,634 B1 | 1/2002 | Osterkil |
| 6,349,978 B1 | 2/2002 | McFarland |
| 6,390,511 B1 | 5/2002 | Kargula |
| 6,447,017 B1 | 9/2002 | Gilbreath et al. |
| 6,464,266 B1 | 10/2002 | O'Neill et al. |
| 6,510,895 B1 | 1/2003 | Koleilat |
| 6,517,126 B1 | 2/2003 | Peterson |
| 6,561,551 B2 | 5/2003 | Kawakami et al. |
| 6,604,760 B2 | 8/2003 | Cresswell et al. |
| 6,629,708 B2 | 10/2003 | Williams et al. |
| 6,769,720 B2 | 8/2004 | Dahms et al. |
| 6,893,051 B1 | 5/2005 | Park |
| 6,964,435 B2 | 11/2005 | Wolf et al. |
| 6,983,959 B2 | 1/2006 | Wolf et al. |
| 6,986,533 B2 | 1/2006 | Ko |
| 6,991,265 B2 | 1/2006 | Walmsley |
| 7,029,035 B2 | 4/2006 | Seymour, II et al. |
| 7,100,949 B2 | 9/2006 | Williams et al. |
| 7,140,645 B2 | 11/2006 | Cronley |
| 7,195,286 B2 | 3/2007 | Hama |
| 7,208,052 B2 | 4/2007 | Hammond et al. |
| 7,240,929 B2 | 7/2007 | Williams et al. |
| 7,264,281 B2 | 9/2007 | LeQuere |
| 7,273,236 B2 | 9/2007 | LeQuere |
| 7,293,758 B2 | 11/2007 | Hsueh-Feng |
| 7,369,595 B2 | 5/2008 | Williams et al. |
| 7,387,318 B2 | 6/2008 | Yoshida |
| 7,419,012 B2 | 9/2008 | Lynch |
| 7,488,006 B2 | 2/2009 | Dahms et al. |
| 7,506,899 B2 | 3/2009 | Feith |
| 7,516,989 B2 | 4/2009 | Yoshida |
| 7,533,908 B2 | 5/2009 | Vogel |
| 7,543,854 B2 | 6/2009 | Dahms |
| 7,614,668 B1 | 11/2009 | Williams et al. |
| 7,699,358 B2 | 4/2010 | Williams et al. |
| 7,762,595 B2 | 7/2010 | Enderich et al. |
| 7,806,443 B1 | 10/2010 | Plattner |
| 7,850,208 B2 | 12/2010 | Greenberger |
| 7,914,050 B2 | 3/2011 | Udhofer |
| 7,922,214 B2 | 4/2011 | Nakamura et al. |
| 8,033,524 B2 | 10/2011 | Tiberghlen |
| 8,240,719 B2 | 8/2012 | Udhofer |
| 8,555,624 B2 | 10/2013 | Lechner |
| 8,757,670 B2 | 6/2014 | Kim |
| 8,882,156 B2 | 11/2014 | Guest |
| 9,447,906 B2 | 9/2016 | Bobo |
| 9,541,228 B2 | 1/2017 | Bobo |
| 9,611,965 B2 | 4/2017 | Cheon |
| 9,746,114 B2 | 8/2017 | LeQuere |
| 9,803,782 B2 | 10/2017 | Dehmer |
| 2002/0140227 A1 | 10/2002 | Kawakami et al. |
| 2004/0094957 A1 | 5/2004 | Walmsley |
| 2005/0023832 A1 | 2/2005 | Edler |
| 2006/0220380 A1 | 10/2006 | Yoshino |
| 2007/0013188 A1 | 1/2007 | Dallas |
| 2007/0164563 A1 | 7/2007 | Arstein et al. |
| 2008/0088127 A1 | 4/2008 | Tiberghien |
| 2008/0136178 A1 | 6/2008 | Udhofer et al. |
| 2008/0220380 A1 | 9/2008 | Bristol et al. |
| 2009/0121478 A1 | 5/2009 | Tsujita |
| 2009/0178733 A1 | 7/2009 | Somers et al. |
| 2009/0214287 A1 | 8/2009 | Usui et al. |
| 2010/0171302 A1 | 7/2010 | Yoder |
| 2010/0300705 A1 | 12/2010 | Nelson |
| 2011/0227337 A1 | 9/2011 | Kattler |
| 2013/0020799 A1 | 1/2013 | Silveira |
| 2013/0119659 A1 | 5/2013 | Williams et al. |
| 2013/0207385 A1 | 8/2013 | Williams et al. |
| 2015/0115602 A1 | 4/2015 | Clason et al. |
| 2015/0240980 A1 | 8/2015 | Bobo et al. |
| 2015/0263498 A1 | 9/2015 | Thomas |
| 2015/0345683 A1 | 12/2015 | Crompton |
| 2016/0126716 A1 | 5/2016 | Crompton |
| 2016/0161038 A1 | 6/2016 | Crompton |
| 2016/0273695 A1 | 9/2016 | Bobo |

(56) References Cited

U.S. PATENT DOCUMENTS

| | | |
|---|---|---|
| 2016/0312932 A1 | 10/2016 | Williams et al. |
| 2016/0327196 A1 | 11/2016 | Gledhill |
| 2017/0082231 A1 | 3/2017 | Crompton |

FOREIGN PATENT DOCUMENTS

| | | |
|---|---|---|
| DE | 2741512 | 4/1979 |
| DE | 7914106 | 8/1979 |
| DE | 2824943 | 12/1979 |
| DE | 2856069 | 7/1980 |
| DE | 2912160 | 10/1980 |
| DE | 423844 | 6/1994 |
| DE | 10125499 | 8/2002 |
| DE | 102006015555 | 1/2007 |
| DE | 202006018794 | 4/2008 |
| DE | 19932307 | 1/2011 |
| EP | 156575 | 10/1985 |
| EP | 368795 | 5/1990 |
| EP | 373920 | 6/1990 |
| EP | 511436 | 11/1992 |
| EP | 615089 | 9/1994 |
| EP | 676019 | 10/1995 |
| EP | 715111 | 6/1996 |
| EP | 718538 | 6/1996 |
| EP | 735306 | 10/1996 |
| EP | 762036 | 3/1997 |
| EP | 898109 | 2/2000 |
| EP | 1235023 | 8/2002 |
| EP | 2163802 | 3/2010 |
| EP | 2589848 | 5/2013 |
| EP | 2558763 | 3/2016 |
| EP | 2817548 | 3/2016 |
| FR | 2545908 | 11/1984 |
| GB | 2104607 | 3/1983 |
| GB | 2325718 | 12/1998 |
| GB | 2398612 | 8/2004 |
| GB | 2445701 | 7/2008 |
| GB | 2480880 | 12/2011 |
| JP | H01112098 | 4/1989 |
| JP | H022035 | 1/1990 |
| JP | H0320637 | 3/1991 |
| JP | H05312283 | 11/1993 |
| JP | H06272795 | 9/1994 |
| JP | H07190272 | 7/1995 |
| JP | 2001-182883 | 7/2001 |
| JP | 2003014169 | 1/2003 |
| JP | 2009523967 | 6/2009 |
| JP | 2013-542378 | 11/2013 |
| JP | 2013542378 | 11/2013 |
| WO | 97/13394 | 4/1997 |
| WO | 02/29300 | 4/2002 |
| WO | 02/29301 | 4/2002 |
| WO | 07/084183 | 7/2007 |
| WO | 07/117688 | 10/2007 |
| WO | 2008/051500 | 5/2008 |
| WO | 2011/102637 | 8/2011 |
| WO | 20110102637 | 8/2011 |
| WO | 12/018576 | 2/2012 |
| WO | 13/056273 | 4/2013 |

OTHER PUBLICATIONS

Office action from European Application No. 16719710.2 dated Nov. 16, 2018.
International Search Report and Written Opinion from PCT/US2016/028741 dated Aug. 30, 2016.
International Search Report and Written Opinion from PCT/US11/45145 dated Dec. 23, 2011.
International Search Report and Written Opinion from PCT/US11/056259 dated Feb. 29, 2012.
International Search Report and Written Opinion from PCT/US14/61704 dated Jan. 14, 2015.
Notice of Allowance from U.S. Appl. No. 13/878,828 dated Aug. 11, 2017.
Advisory Action from U.S. Appl. No. 13/878,828 dated Jul. 19, 2017.
Office action from U.S. Appl. No. 13/878,828 dated Mar. 31, 2017.
Interview Summary from U.S. Appl. No. 13/878,828 dated Dec. 2, 2016.
Office action from U.S. Appl. No. 13/878,828 dated Sep. 8, 2016.
Office action from U.S. Appl. No. 13/878,828 dated May 18, 2015.
Office action from Chinese Application No. 201180036507.7 dated Jun. 27, 2014.
Office action from Chinese Application No. 201180049676.4 dated Jul. 28, 2014.
Office action from Chinese Application No. 201180049676.4 dated May 26, 2015.
Office action from Chinese Application No. 201480070848.X dated May 17, 2017.
Search Report from European Patent Application No. 11815036.6 dated May 27, 2014.
Search Report from European Application No. 14856769.6 dated May 2, 2017.
Quick connect Plumbing Solutions Video web pages, Watts.com, 2 pgs., copyright 2017.
Plumbing Supply.Com, Speedfit Quick Connect Fittings by John Guest, 40 pgs., accessed on Apr. 27, 2017.
Speedfit Plastic push-in fittings stop valve, 1 pg., issued Jul. 1997, RS Components.
Office action from Chinese Application No. 201480070848.X dated Dec. 27, 2017.
Office action from Japanese Application No. 2016-550469 dated Sep. 12, 2018.
Office action from Indian Application No. 201647017415 dated Jan. 17, 2020.
Office action from U.S. Appl. No. 16/437,095 dated Oct. 18, 2019.
Office action from Korean Application No. 10-2019-7025721 dated Nov. 7, 2019.

* cited by examiner

SINGLE ACTION PUSH TO CONNECT CONDUIT FITTING

RELATED APPLICATION

The present application is a continuation application of U.S. Ser. No. 14/520,616, filed Oct. 22, 2014, titled SINGLE ACTION PUSH TO CONNECT CONDUIT FITTING, which claims the benefit of U.S. Provisional Patent Application Ser. No. 61/895,043 filed on Oct. 24, 2013 for SINGLE ACTION PUSH TO CONNECT CONDUIT FITTING, the entire disclosure of which is fully incorporated herein by reference.

TECHNICAL FIELD OF THE DISCLOSURE

The inventions relate generally to fittings for conduits such as tube and pipe. More particularly, the inventions relate to fittings that provide single action push to connect operation.

SUMMARY OF THE EXEMPLARY EMBODIMENTS

Figure 1:
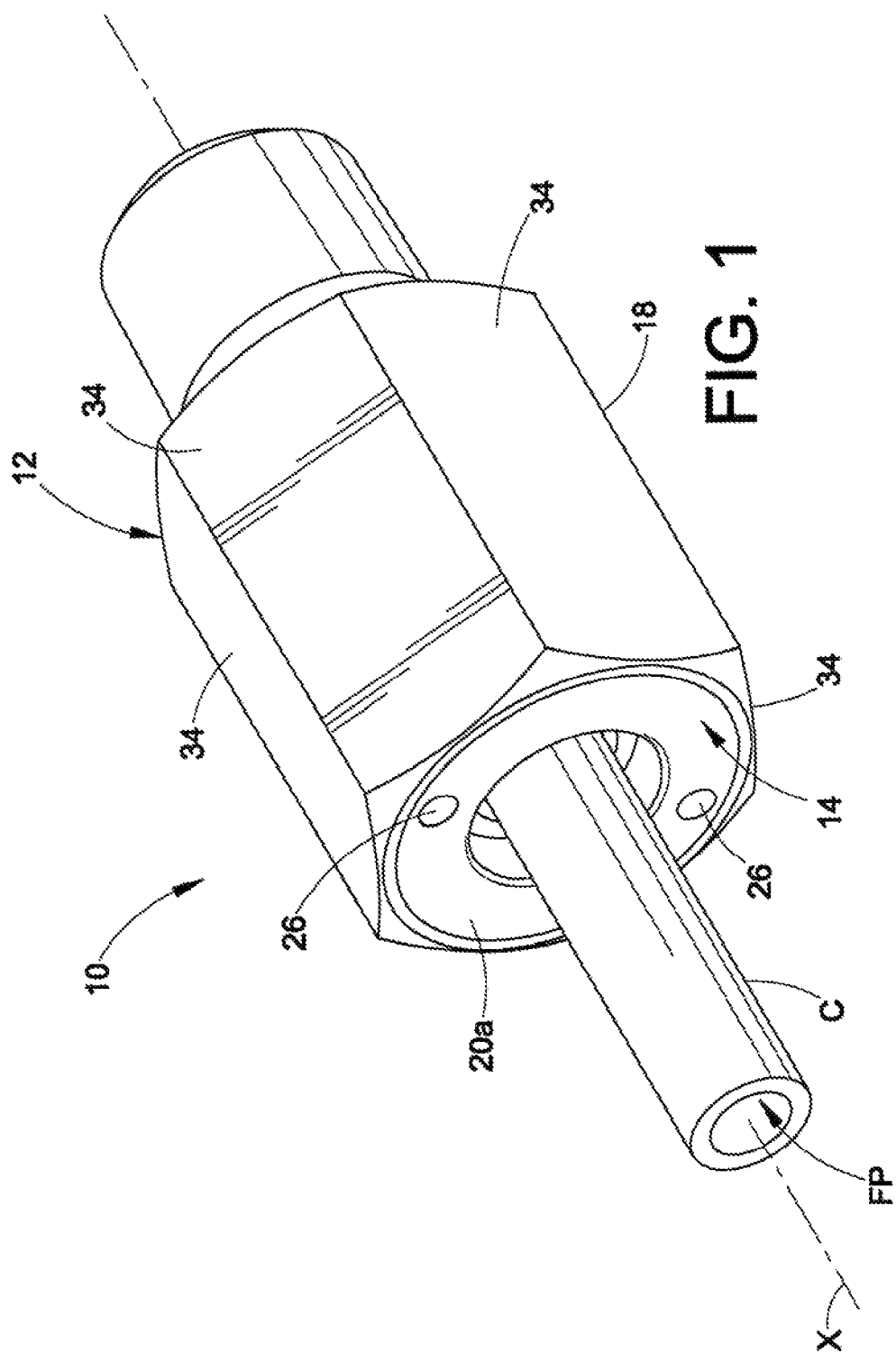
FIG. 1 is an isometric end view of an exemplary embodiment of a fitting assembly with a conduit fully inserted.

A first inventive concept described herein is a fitting assembly for conduit, for example tube or pipe, in which a single action on the conduit can be used to achieve a fluid tight seal and retention of the conduit without need for subsequent action or motion. In an embodiment, a conduit can optionally be hand held or otherwise inserted into a first end of the fitting assembly so as to engage a seal device and a conduit gripping member with a single action on the conduit to achieve a fluid tight seal and retention of the conduit by the conduit gripping member. No subsequent action is needed such as rotation, tightening or clamping of the fitting components. This embodiment may also be referred to herein as a single action push to connect fitting. Additional embodiments are described herein.

A second inventive concept described herein is a fitting assembly for conduit such as tube or pipe in which a single action on the conduit can be used to achieve a fluid tight seal and retention of the conduit without need for subsequent action or motion. In an embodiment, the fitting assembly may include a first fitting component or subassembly and a second fitting component or subassembly. The first fitting component and the second fitting component can be joined or assembled together to form a fitting assembly, and the assembled fitting allows for a single action on the conduit to be used to achieve a fluid tight seal and retention of the conduit. Additional embodiments are described herein.

In another embodiment, a first fitting component or subassembly comprises a seal device that can be used to seal the first fitting component and the conduit against fluid pressure. A second fitting component or subassembly comprises a retainer that grips the conduit, for example, against fluid pressure, when the conduit is inserted into the second fitting component subassembly. The first fitting component and the second fitting component are adapted to be joined together to form a single action push to connect fitting assembly. Additional embodiments are described herein.

In another embodiment, a first fitting component or subassembly comprises a seal device that can be used to seal the first fitting component and the conduit against fluid pressure. A second fitting component or subassembly comprises a retainer that grips the conduit against fluid pressure when the conduit is inserted into the second fitting component subassembly. The first fitting component and the second fitting component are adapted to be joined together to form a single action push to connect fitting assembly, wherein fluid pressure in the conduit increases gripping force applied by the retainer against the conduit. Additional embodiments are described herein.

These and additional aspects and embodiments of the inventions will be understood by those skilled in the art from the following detailed description of the exemplary embodiments in view of the accompanying drawings.

DETAILED DESCRIPTION OF EXEMPLARY EMBODIMENTS

Herein, the terms fitting and fitting assembly are used interchangeably. In various exemplary embodiments, a fitting assembly structure as taught herein is separately claimed as an invention without requiring the conduit to be part of the fitting assembly, and further without requiring that the various parts be in a fully assembled condition (such as may be the case, for example, of the assembly parts being shipped from a manufacturer or distributor.) In at least one embodiment, a fitting assembly includes a first fitting component or subassembly having a seal device and a second fitting component or subassembly having a retainer. In any of the embodiments described herein, the conduit does not require treatment or modification from stock condition, although optionally such may be done if needed in particular applications. For example, it is common for the conduit end to be cut substantially perpendicular to the conduit longitudinal axis and deburred as needed, but even these common steps are optional and not required to achieve conduit grip and fluid tight seal. By stock condition is meant that the conduit may be a conventional hollow right cylinder having a cylindrical inner surface that may be exposed to fluid (for example, liquid, gas or other flowable material) contained by the conduit, and a cylindrical outer surface, with a wall thickness defined as the difference between the inner diameter and the outer diameter of the conduit. The conduit may be made of any material, is preferably metal, and more preferably is a stainless steel alloy, but the inventions are not limited to these exemplary materials and other alternative materials may be used as needed for particular applications.

Although traditional hollow cylindrical conduits are preferred, other conduit shapes and geometry may alternatively be used for either the outer wall or inner wall or both walls of the conduit. The word conduit herein refers to traditional tube and pipe but also includes other hollow fluid carrying structures that might be referred to by another word other than tube or pipe.

Figure 2:
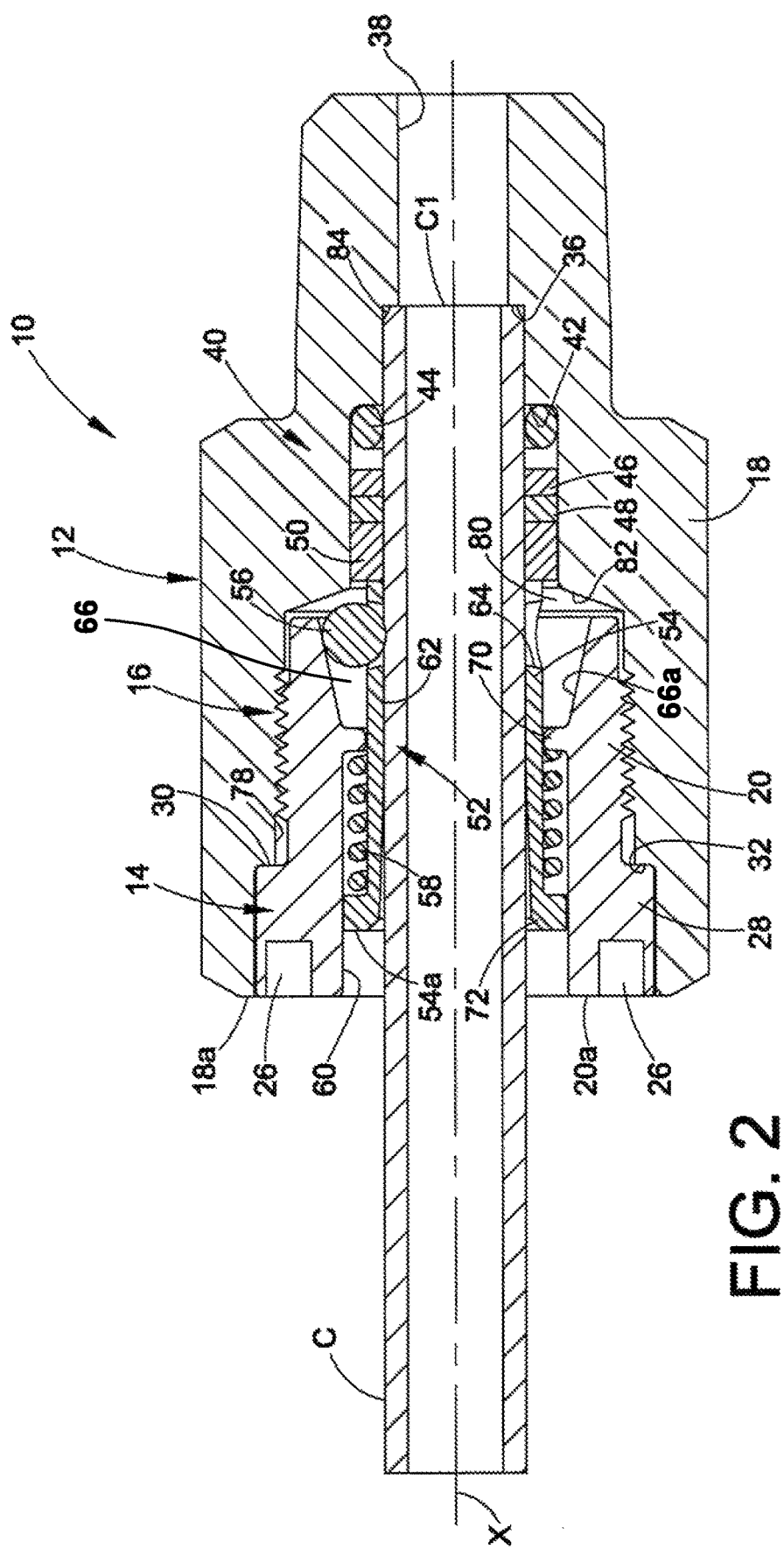
FIG. 2 is the fitting assembly of claim 1 in longitudinal section.
Figure 3:
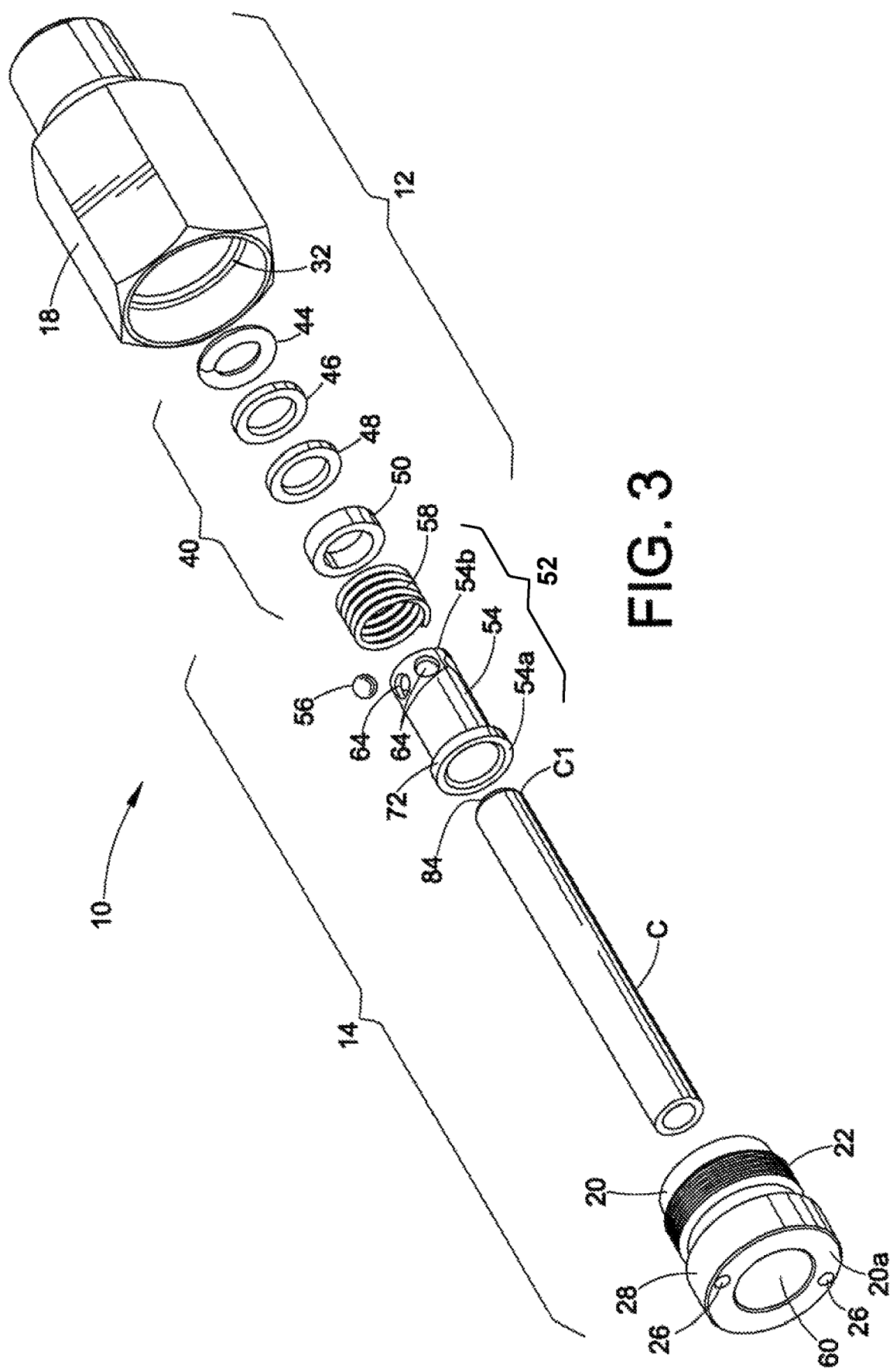
FIG. 3 is an exploded isometric of the fitting assembly of FIG. 1 including the conduit.

With reference to FIGS. 1-3, an embodiment of a fitting assembly 10 is represented. The fitting assembly 10 provides for or allows single action push to connect operation. By single action is meant that a conduit C, and in particular the end portion C1 of the conduit end C, can be inserted into the fitting assembly 10 with a single dimensional or directional movement or action, and when fully inserted the conduit C is sealed against fluid pressure and is retained in position. The axial insertion may be performed manually or by a tool or machine. By push to connect is meant that the single action may be a simple axial movement or push along the longitudinal axis of the conduit C and that this single action is the only action needed to complete the mechanical connection between the conduit C and the fitting assembly 10. No subsequent or additional motion or action is needed to complete the mechanical connection and fluid tight seal. In an exemplary embodiment, the single directional action or movement is an axial movement along a longitudinal axis of the conduit C. No other or additional or subsequent manual or tool action or movement of the fitting assembly 10 components is needed to achieve conduit seal and retention. Thus, a single action push to connect fitting is distinguished from a traditional fitting assembly that typically is pulled-up or tightened to effect conduit grip and seal by relative movement of the fitting assembly components after insertion of the conduit; for example, a body and a nut that are joined by a threaded mechanical connection and pulled-up by relative rotation of the body and nut, or by being clamped together without a threaded mechanical connection.

Herein, the terms axis or axial and derivative forms thereof refer to a longitudinal axis X along which a conduit C will be inserted and retained. Reference to radial and radial direction and derivative terms also are relative to the X axis unless otherwise noted. In the illustrated embodiments, the axis X may be the central longitudinal axis of the conduit C which also may but need not correspond with or be coaxial with the central longitudinal axis of the fitting assembly 10. The conduit C may be any conduit that defines a flow path FP for system fluid that is contained by the conduit C and the fitting 10. The inventions and embodiments described herein are particularly suitable for metal conduit such as metal pipe or tube, however, non-metal conduits may also be used as needed. The conduit C may have any range of diameter size, for example, 1/16th inch or less to 3 inches or greater in diameter and may be in metric or fractional sizes. The conduit C may also have any range of wall thickness that allows for an axial insertion into the fitting assembly 10.

The fitting assembly 10 may include two discrete sections or subassemblies. In an embodiment, the fitting assembly 10 may include a first fitting component or subassembly 12 and a second or fitting component or subassembly 14. The first fitting component 12 and the second fitting component 14 may be joinable or mate together in any manner suitable for the application or use of the fitting assembly 10. For example, the first fitting component 12 and the second fitting component 14 may be joinable together using a threaded mechanical connection 16 (FIG. 2.) Many other mechanical connections may alternatively be used, including but not limited to a clamped connection or bolted connection or crimped connection, to name three examples, or non-mechanical connections may be used, for example, a weldment.

Note that although the conduit C is shown in FIG. 3, the conduit C is not considered to be part of the second fitting component 14.

FIGS. 1-3 illustrate the fitting assembly 10 in a fully assembled condition, and further with the conduit C fully inserted or seated in the fitting assembly 10. In this position, the conduit C is sealed and retained in position, especially against fluid pressure, although the fitting assembly 10 may be used in low or zero or negative pressure applications.

Figure 4:
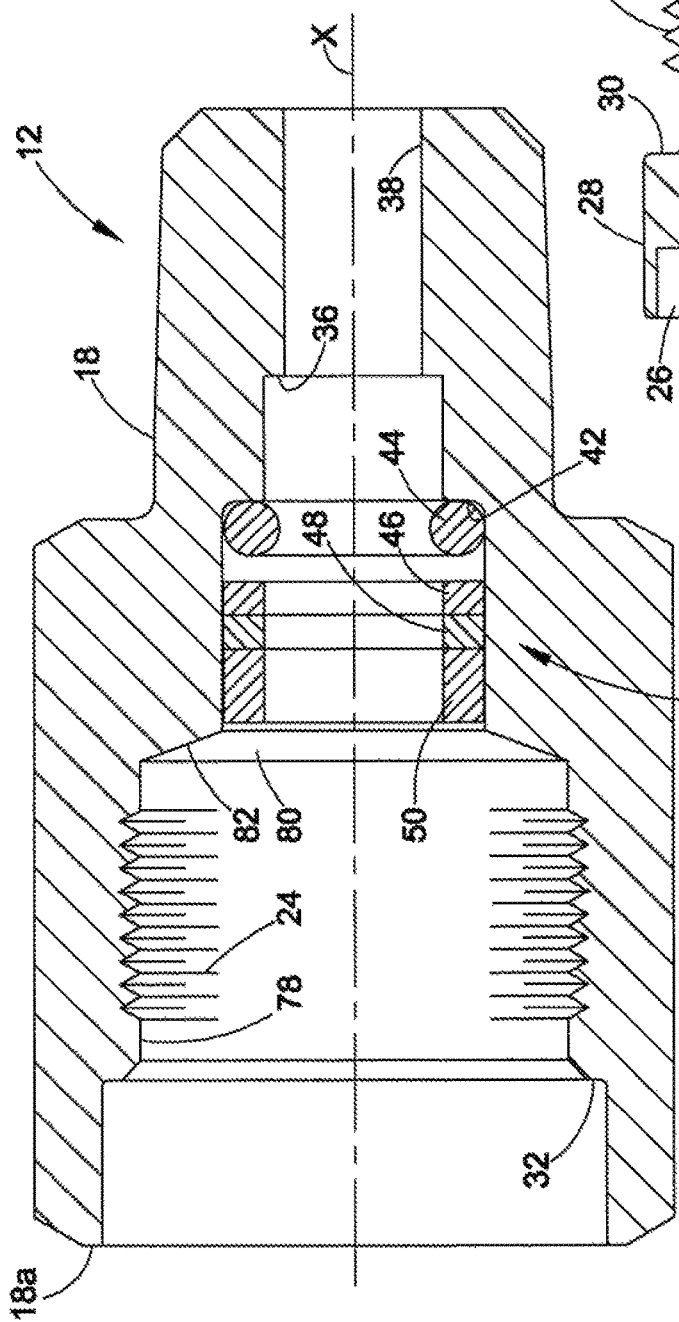
FIG. 4 is an embodiment of a first fitting component subassembly that may be used in the embodiment of FIGS. 1-3 in longitudinal section.
Figure 5:
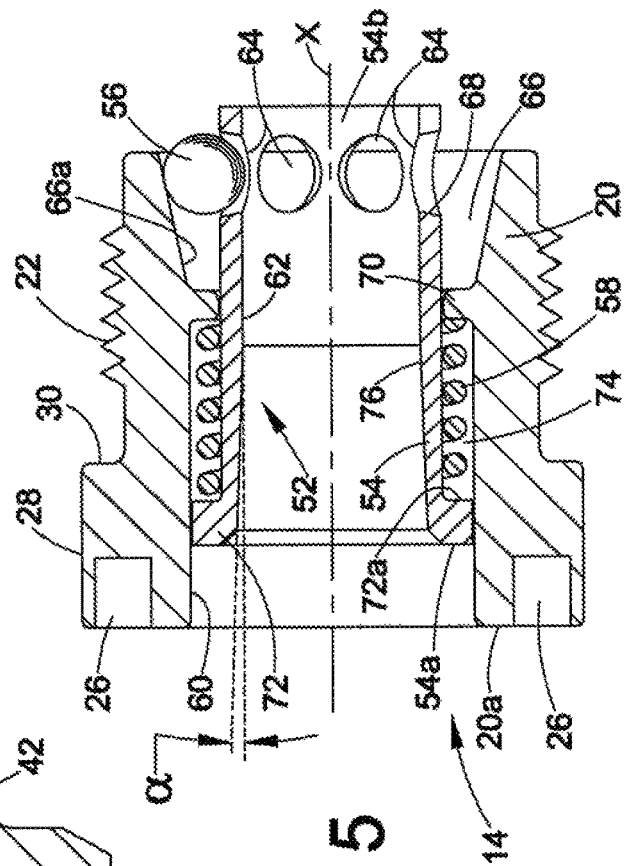
FIG. 5 is an embodiment of a second fitting component subassembly that may be used in the embodiment of FIGS. 1-3 in longitudinal section.

With additional reference to FIGS. 4 and 5, the first fitting component 12 may be realized as a body subassembly. The first fitting component may include a body 18 that is adapted to receive the conduit end C1. Although it is common to call the conduit receiving fitting component a body in fitting terminology, the first fitting component 12 may use a fitting component other than what might be considered a fitting body. Also, the body 18 need not be a standalone component, but alternatively may be formed as a cavity in a block, for example a manifold or a valve body to name a couple of examples. Such body embodiments are commonly known in the art as a port or a ported fitting.

The second fitting component 14 may be realized as a nut subassembly. The second fitting component 14 may include a nut 20 through which the conduit end C1 passes into the body 18. Although it is common to call the mating second fitting component 14 a nut in fitting terminology, the second fitting component 14 may be a fitting component other than what might be considered a fitting nut.

Although the exemplary embodiment illustrates a male threaded nut 20 having male threads 22 and a female threaded body 18 having mating female threads 24, an alternative would be to have the nut 20 be female threaded and the body 18 be male threaded. And as noted above, the body 18 and the nut 20 may be joinable by many different techniques, including a mechanical connection other than a threaded mechanical connection 16. Moreover, the body 18 and the nut 20 may be made of any suitable material, for example stainless steel or other metal, or may be made of non-metals, for example plastics or polymers or composite materials or other suitable materials, as needed. For embodiments in which the conduit C is stainless steel or other metal, the body 12 and the nut 14 are preferably made of metal and more preferably stainless steel alloy. Also, in additional embodiments, the body 12 and the nut 14 are preferably all metal.

The nut 20 may include two or more pin holes 26 that can be used to receive a tool that is used to drive the nut 20 into the body 18, for example by rotation of the nut 20 relative to the body 18 about the axis X. It will be noted that the axial dimension of the nut 20 may be selected so that the outboard end 20a of the nut 20 appears flush with the outboard end surface 18a of the body 18, when the nut 20 is fully tightened, but this flush arrangement is optional. The nut 20 may also include a flange 28 having an end surface 30 that engages a first counterbore surface 32 in the body 18. This engagement between the nut end surface 30 and the body first counterbore surface 32 provides a positive stop to further tightening of the nut 20 relative to the body 18 thereby preventing over-tightening. As best viewed in FIG. 1, the body 18 may include wrench flats 34, for example hex flats, to assist in tightening the body 18 and the nut 20 together when a threaded mechanical connection is used.

The body 18 may include an optional second counterbore or socket 36 that is adapted to receive the conduit end C1. The second counterbore 36 of the body 18 may be used as a positive stop during insertion of the conduit C into the fitting assembly 10 so that the assembler can sense that the conduit C is preferably fully inserted and seated against the counterbore 36 shoulder (see FIG. 2.) However, many other techniques may alternatively be used to control or delimit the axial distance that the conduit C is inserted into the fitting assembly 10. The body 18 may include a flow passage or bore 38 for fluid that passes through the conduit C and the fitting assembly 10. Alternatively, the body 18 may be formed as a cap or plug with the flow passage 38 omitted.

The body 18 retains a seal device 40 that establishes a fluid tight seal against fluid pressure for the outer surface of the conduit C and also to seal the body 18. The body 18 may include a third counterbore 42 that delimits a socket that receives the seal device 40, and as such the body 18 and the seal device 40 form the first fitting component 12. The third counterbore 42 helps to retain the seal device 40 in position when the conduit C is inserted into the fitting assembly 10. The seal device 40 may comprise a single seal member or alternatively multiple seal members as shown in FIGS. 2, 3 and 4. For example, the seal device 40 may include a primary seal member 44 such as, for example, an elastomeric o-ring style seal. Many different primary seal member designs and materials may alternatively be used, including but not limited to a halogen polymer (for example, PTFE), carbon (for example, expanded graphite), soft metal (for example, silver), spring metal (for example, X750, 17-4PH.) The seal device 40 may further include one or more optional backing rings 46, 48 which may be used as needed to help reduce extrusion of the softer primary seal 44 under pressure. The backing rings 46, 48 may be made of a harder plastic material, for example PTFE or PEEK as compared to the primary seal member 44. An optional gland 50, which may be metal or other suitable material as needed, may be used to reduce or prevent damage to the seal device 40 due to contact with a retainer (described below) and also to help retain the seal device 40 in position as part of the first fitting component 12. The primary seal member 44 provides a fluid tight seal for the fitting 10 by being compressed against the outer surface of the conduit C and one or more surfaces of the third counterbore 42 or socket in which the seal member 44 is disposed within the body 18. The seal device 44 therefore provides a primary body seal to contain fluid within the fitting 10 so as to prevent fluid that is in the conduit C from escaping to the ambient or surrounding environment. The body seal and the conduit seal are effected when the conduit C has been inserted axially into the body 12 sufficiently so as to pass through the primary seal member 44.

The second fitting component 14 as noted may include the nut 20, and also a retainer 52. The retainer 52 operates to grip and lock or otherwise retain the conduit C with the nut 20 when the conduit C has been sufficiently inserted axially into the fitting assembly 10 so as to engage the retainer 52. It will be noted from the following description that the retainer 52 can grip and retain the conduit C with the nut 20 at an axial position that is less than a full insertion used to achieve conduit seal by the seal device 40. The conduit C can optionally even be retained with the nut 20 when the nut 20 has not been assembled to the body 18.

In an embodiment (see FIG. 5,) the retainer 52 may be a subassembly comprising a ball cage 54, a conduit gripping member 56 and a biasing member 58. Although the ball cage 54 and the conduit gripping member 56 are shown as two distinct parts, alternatively other retainer designs may be used that would integrate this functionality into a single part, further optionally including the functionality of the biasing member 58. The conduit gripping member 56 may be realized in the form of one or more preferably spherical balls 56, although other conduit gripping member designs may alternatively be used as needed. In FIG. 5 the conduit gripping member 56 appears to be displaced out of contact with the ball cage 54 even though there is no conduit it FIG. 5. This is done for clarity and understanding of the structure. Those skilled in the art will readily understand that when the conduit C is not positioned in the retainer 52 the balls 56 drop partially into the ball cavities (64) as explained further below.

FIGS. 4 and 5 thus illustrate an embodiment in which the first fitting component 12 is a standalone subassembly and the second fitting component 14 is also a standalone subassembly. The first fitting component 12 and the second fitting component 14 when assembled or joined together thus provide or form the fitting assembly 10. The fitting assembly 10 therefore is a simple two part assembly which can simplify assembly and use in the field. The first fitting component 12 and the second fitting component 14 may be assembled together at the manufacturer, a distributor or by the end user. After the first fitting component 12 and the second fitting component 14 have been assembled together, the fitting assembly 10 provides a complete single action push to connect fitting by which all that is needed to make a mechanical connection with a conduit end, as well as seal the conduit end against fluid pressure, is to push the conduit end into the fitting assembly 10 until the conduit end preferably bottoms against the second counterbore 36 or alternatively is axially inserted into the fitting assembly so that the seal device 40 engages with the outer surface of the conduit C. The conduit C may be inserted manually or alternatively by use of a tool or a machine or other convenient means. Insertion of the conduit C into the fitting assembly 10 makes the mechanical connection and the fluid tight seal between the conduit C and the fitting assembly 10 without any required subsequent or further or additional action or motion.

The ball cage 54 may be adapted to move or shift axially within a central bore 60 of the nut 20. The ball cage 54 includes a through bore 62 that preferably is at least cylindrical partially admits insertion of the conduit C into the fitting assembly 10 (FIG. 2) with a preferably close fit. An inward end portion 54b of the ball cage 54 includes one or more ball cavities 64 that position or trap the balls 56 within a preferably tapered wall cavity 66 of the nut 20. The tapered wall cavity 66 of the nut 20 is delimited by a tapered wall 66a that preferably is frusto-conical, but alternatively other geometric shapes and forms may be used as needed. Note that in FIG. 5 as well as FIGS. 2 and 8 for clarity we only show one ball 56, but in practice there may be a ball 56 in each ball cavity 64 or fewer balls 56 may be used, although preferably there will be at least three balls used. Each ball cavity 64 may include a beveled or shaped ball cavity wall or surface 68 that may be sized and beveled or shaped to prevent the associated ball 56 from falling through the ball cavity 64. However, each ball cavity 64 is preferably sized so that at least a portion of each ball 56 protrudes through the associated ball cavity 64 so as to make contact with the conduit C outer surface (see FIGS. 2 and 6).

The balls 56 may be made of any suitable material as needed, preferably made of metal especially when used with a metal conduit C, and more preferably made of stainless steel.

The central bore 60 of the nut 20 may include a radially inward projecting rib 70 and the outboard end 54a of the ball cage 54 may include a radially outwardly projecting flange 72 that presents an inner surface 72a that faces towards the rib 70. The flange 72 and the rib 70 along with the central bore 60 of the nut 20 define a slot 74 that receives the biasing member 58. The biasing member 58 may be realized in the form of a coiled spring as shown, however, many other types of biasing members may alternatively be used. The spring or biasing member 58 is compressed in the slot 74 so as to apply an outwardly directed axial force on the ball cage 54. By outwardly is meant in an axial direction away from the conduit end C1. The ball cage 54 is able to move or shift axially although the movement or shift may be slight and perhaps imperceptible by visual or tactile feedback. The axial bias produced by the spring 58 pulls the balls 56 that sit in the ball cavities 64 in towards the radially narrower portion of the tapered wall cavity 66 such that the balls 56 engage the tapered wall 66a and are trapped against the tapered wall 66a because of the limited radial movement permitted by the ball cavities 64. The trapped balls 56 thus also prevent the spring 58 from pushing the ball cage 54 out through the nut central bore 60.

It will be noted that the amount of axial movement or shift of the ball cage 54 will be a function of a number of design factors including the size of the balls 56 relative to the size of the tapered wall cavity 66. The biasing member 58 thus serves to maintain the retainer 52 with the nut 20 as a complete subassembly of the second fitting component 14. Also note that in FIG. 2 (as well FIG. 8) the spherical ball 56 is shown centered in the respective ball cavity 64, but this is an artifact of the drawing model. In practice, the biasing member 58 axially biases the ball cage 54 outwardly so as to wedge the balls 56 between the tapered wall 66a and the outer surface of the conduit C. The balls 56 therefore would be in contact with the forward or inward portion of the ball cavity wall or surface 68 that delimits the ball cavity 64.

Figure 6:
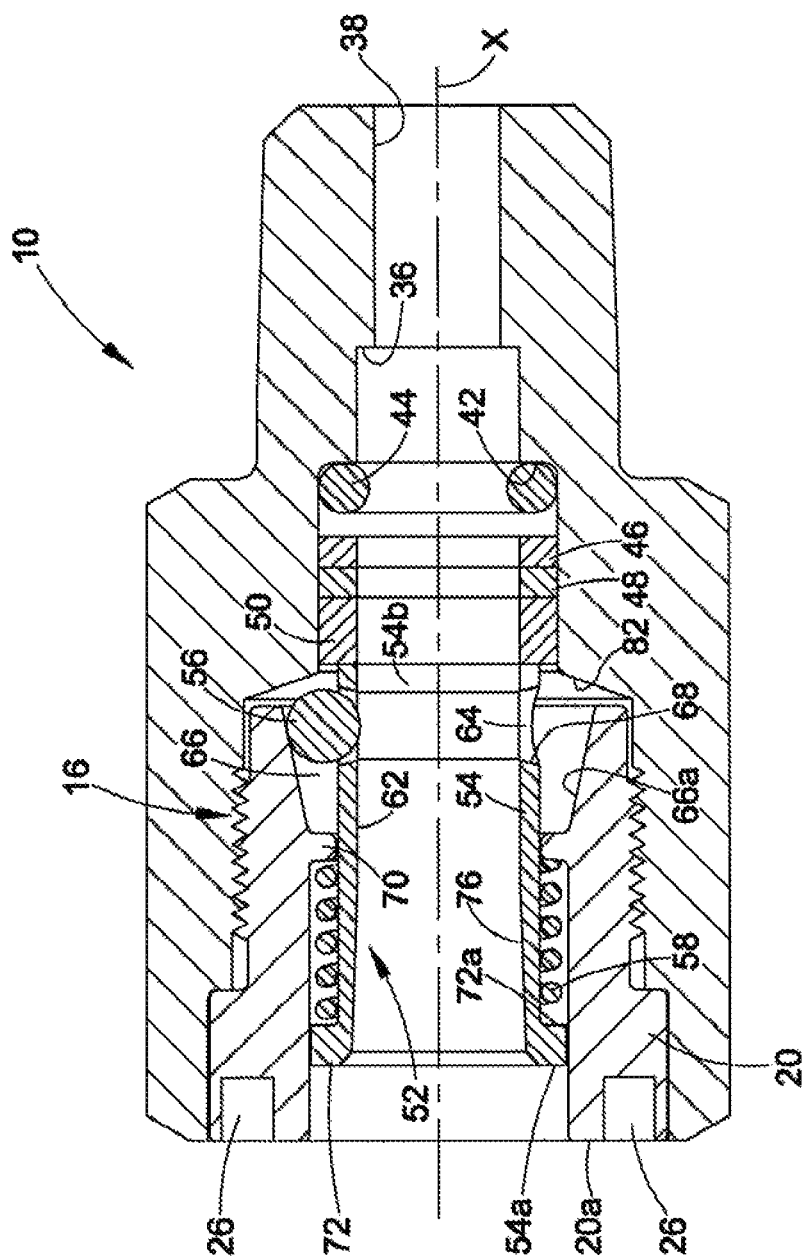
FIG. 6 is the fitting assembly of FIG. 2 shown in longitudinal section prior to insertion of the conduit C into the fitting assembly.
Figure 7:
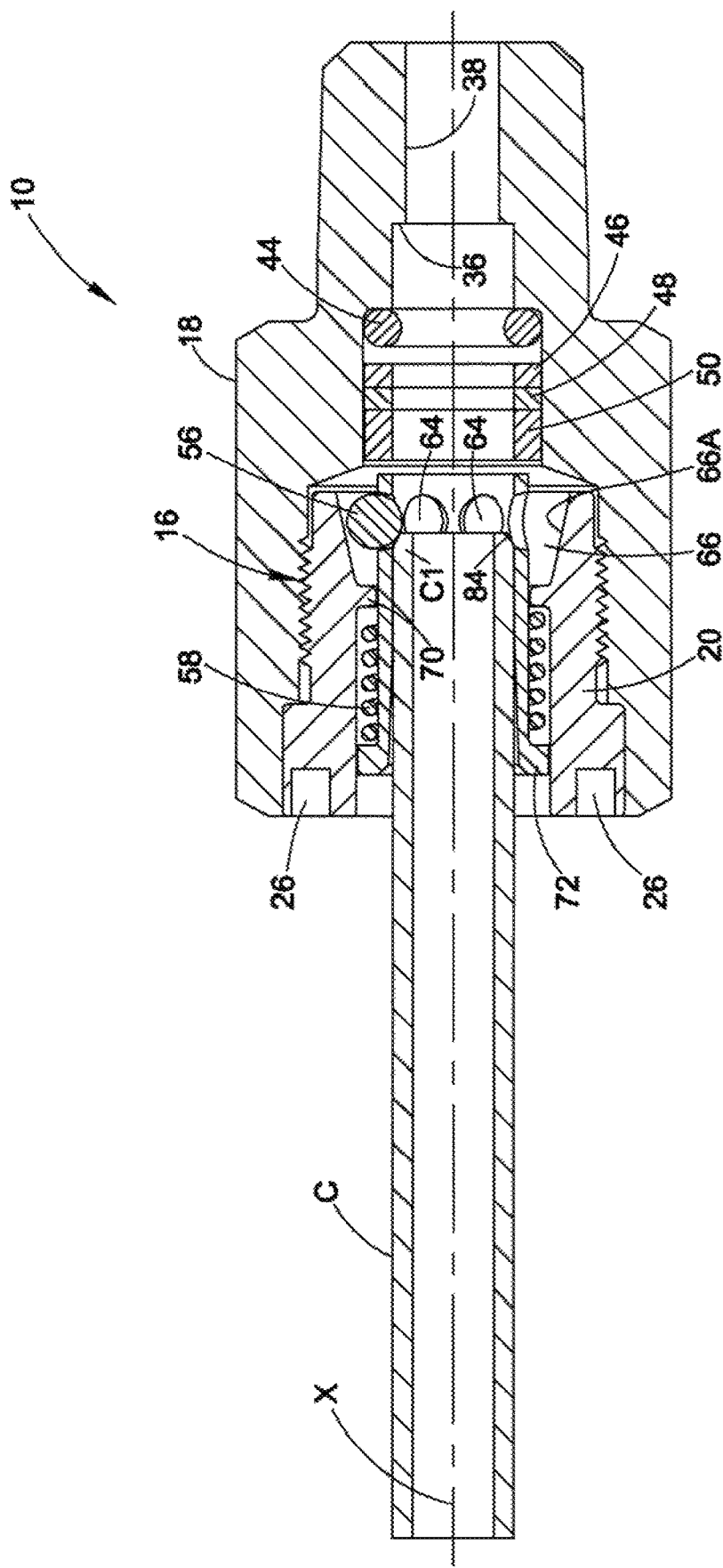
FIG. 7 is the fitting assembly of FIG. 2 shown in longitudinal section with partial insertion of the conduit C into the fitting assembly.

With reference to FIGS. 6 and 7, as the conduit C is inserted into the fitting assembly 10, the conduit end C1 will contact or engage the balls 56 which partially protrude through the ball cavities 64. The initial contact of the conduit end C1 with the balls 56 is shown in FIG. 7. As the conduit end C1 is further inserted, the balls 56 and the ball cage 54 are moved or shifted axially inward against the force of the spring 58 so that the balls 56 can be radially displaced further (by a rolling action of the balls 56 on the outer surface of the conduit C) into the ball cavities 64 and the tapered wall cavity 66 so as to allow the conduit end C1 to be fully inserted into the second counterbore 36 of the body 18. This movement occurs due to frictional engagement between the balls 56 and the conduit end C1 outer surface. This same frictional engagement helps to prevent the conduit C from simply being pulled out once it has engaged with the balls 56. The conduit end C1 may include a chamfer (84 in FIG. 2) to facilitate initial contact with the balls 56. The amount of axial and radial shift or movement of the balls 56 may typically be rather small and just enough so as to allow the conduit end to be inserted fully. All that is needed is enough movement to release load of the balls 56 against the conduit so that the conduit freely slides into the fitting 10. Conduit insertion may be done by any convenient means or technique, including but not limited to hand-held manual insertion, use of a tool to assist with manual insertion or machine insertion.

When the conduit C has been fully inserted into the second counterbore 36 of the body 18 as represented in FIG. 2, the retainer 52 has an axial position within the nut 14 such that the balls 56 are in contact with the conduit C and the tapered wall 66a due to the bias of the spring 58. We refer to this axial position of the retainer 52 to be the first axial position within or relative to the fitting assembly 10 and that is the axial position for gripping and retaining the conduit C in the fitting assembly 10 to constrain the conduit C from axial withdrawal from the conduit fitting 10. Thus, the balls 56 are wedged and trapped and cannot move radially or axially, thereby exerting a retaining force and tight grip on the conduit C. The biasing member 58 maintains the balls 56 in contact with the tapered wall 66a and the conduit C outer surface, thereby applying a retaining force or load against the conduit C to resist axial withdrawal of the conduit C from the fitting 10. The balls 56 resist axial withdrawal of the conduit C from the ball cage 54 and the more force that is applied to the conduit C to pull it out the stronger is the gripping force and retention due to the wedging action of the balls 56 trapped between the conduit C outer surface and the tapered wall 66a. The friction and radial load between the balls 56 and the conduit outer surface prevents axial movement of the conduit back out of the fitting 10 and this load will increase if an axial force is applied to the conduit C to try to pull the conduit C back out of the fitting 10. Note that the conduit C is trapped in this position in the ball cage 54 even if the nut 14 is not installed in the body 18 (although in that circumstance the conduit can be pushed forward but not pulled rearward, and the spring 58 will prevent the conduit C and the ball cage 54 from falling apart.)

Note also that fluid pressure, from system or working fluid in the conduit C, acting on the seal device 40 (with or without the optional gland 50) and/or an end face of the conduit end C1 will tend to increase axial forces against either the ball cage 54 or the conduit C or both towards the reduced sized portion of the tapered wall cavity 66. These axial forces due to fluid pressure will tend to further increase the compression of the balls 56 against the tapered wall 66a, thus also increasing the grip and retention of the conduit C by the balls 56. It is contemplated that the balls 56 may comprise a harder material than the conduit C so that the balls 56 may actually indent into the outer surface of the conduit C, further increasing resistance to the conduit C being axially withdrawn or forced out of the fitting 10.

However, the conduit C can be easily withdrawn or pulled out of the retainer 52, for example the ball cage 54, by simply applying an axially inward force against the ball cage 54 and the biasing force of the spring 58, for example, by pushing against the flange 72 such as by applying a force against the outboard end 54a of the ball cage. By pushing on the ball cage 54 against the force of the spring 58, the ball cage 54 can be moved or shifted axially forward (as viewed in FIG. 2) to another axial position within the fitting assembly 10 at which the compression on the trapped balls 56 against the conduit C is reduced enough so that the conduit C can be axially withdrawn or removed from the fitting assembly 10. We refer to this axial position of the retainer 52, that is sufficient to reduce the compression on the trapped balls 56 to allow withdrawal of the conduit C, as the second axial position of the retainer 52 within the fitting assembly 10. Again, this movement or shift of the retainer 52 may be slight so as to release the stress on the balls 56. Thus, the retaining force of the balls 56 against the conduit C is lessened and the conduit C will easily slide back out of the fitting assembly 10. The fitting 10 design also allows of repeated re-use, also known as remake, of the fitting, either with the same conduit or a different conduit.

An axially inward force may be applied against the flange 72 of the ball cage 54 either manually such as with fingers or optionally with a tool (not shown.) From FIG. 2 it will be noted that an embodiment of the ball cage 54 has the outboard end 54a axially recessed in the nut 20. If the recess is deep, a tool might be used to push on the ball cage 54. Alternatively, the recess may be shallow enough that fingers or a tool could be used to push on the outboard end 54a. As another alternative, the ball cage 54 may be axially sized so as to position the outboard end 54a either flush, about flush or slightly outside of the nut 20, in any case making it easier to contact the ball cage 54 with a tool or fingers to displace the ball cage 54 so that the conduit C can be withdrawn. Preferably, fluid pressure will be reduced to ambient pressure before the retainer 52 is acted on to allow the conduit C to be withdrawn.

Note further that although preferably the conduit gripping member 56, whether in the form of one or more spherical balls or other form, becomes wedged or trapped between the conduit C outer surface and a preferably tapered surface 66a, other surface geometries or additional components may be used that compress the conduit gripping device 56 against the conduit C to constrain axial withdrawal of the conduit C. It is preferred, whatever technique or structure is used to constrain the conduit C in the fitting assembly 10, that there be a first position and a second position, that can be selected from outside the assembled fitting 10 (for example in the exemplary embodiment pushing the retainer 52 to the second axial position), to release the conduit C for withdrawal from the fitting assembly 10, without necessarily having to loosen or separate the first fitting component 12 and the second fitting component 14.

Note from FIG. 2 that when the ball cage 54 is pushed inward against the force of the spring 58, the distal end of the ball cage 54 could contact the optional gland 50, so that gland 50 helps protect against damage to the seal device 40 in such an event.

An outwardly extending portion 76 of the ball cage 54 inner diameter through bore 62 optionally may be outwardly tapered so as not to apply stress to the conduit C (which can cause fretting) when possible system vibration may impart rotary flex or oscillation of the conduit C. The taper angle α and the length of the tapered portion 76 need only be large enough to reduce or prevent stress being applied to the conduit C by the ball cage 54. This will cause the stress from conduit oscillation or vibration to be concentrated more at the balls 56.

The ball cavities 64 and the balls 56 may be evenly spaced circumferentially from each other in the ball cage 54 so as to further reduce potential damage to the conduit caused by vibration and oscillation of the conduit. An even or uneven number of balls 56 may be used. A benefit of an uneven number of balls 56 is that no two balls will be diametrically opposed to each other when the balls 56 are in position in the ball cage 54.

With reference to FIGS. 2 and 5, the body 18 includes a partially threaded cylindrical bore 78 in which the female threads 24 (FIG. 4) may be formed. This bore 78 may include a fourth counterbore 80 with a tapered shoulder 82. This tapered shoulder 82 may be used to provide additional space for movement of the balls 56 when the ball cage 54 is axially shifted to allow a retained conduit C to be removed. Note also that the conduit end C1 may include the chamfer 84 to reduce or prevent damage to the seal device 40 when the conduit C is inserted into the fitting assembly 10.

Further note that preferably but not necessarily the seal device 40 is axially disposed between the conduit end C1, which is the fluid pressure head, and the retainer 52, with the conduit C being inserted from the retainer side of the fitting assembly 10. In other words, during assembly the conduit C is inserted into the fitting assembly 10 preferably from the axially outward side or end of the retainer 52 (from the left as viewed in FIGS. 2, 6 and 7) and passes through the axially opposite side or end of the retainer 52 before the conduit end C1 engages with or passes through the seal device 40. The conduit therefore is inserted into the fitting assembly 10 preferably from the biasing member side of the retainer 52. This allows easier assembly and retention of the seal device 40 with the fitting body 18 as a subassembly and also helps reduce or prevent system fluid wetting of the retainer 52, for example, the spring 58.

Figure 8:
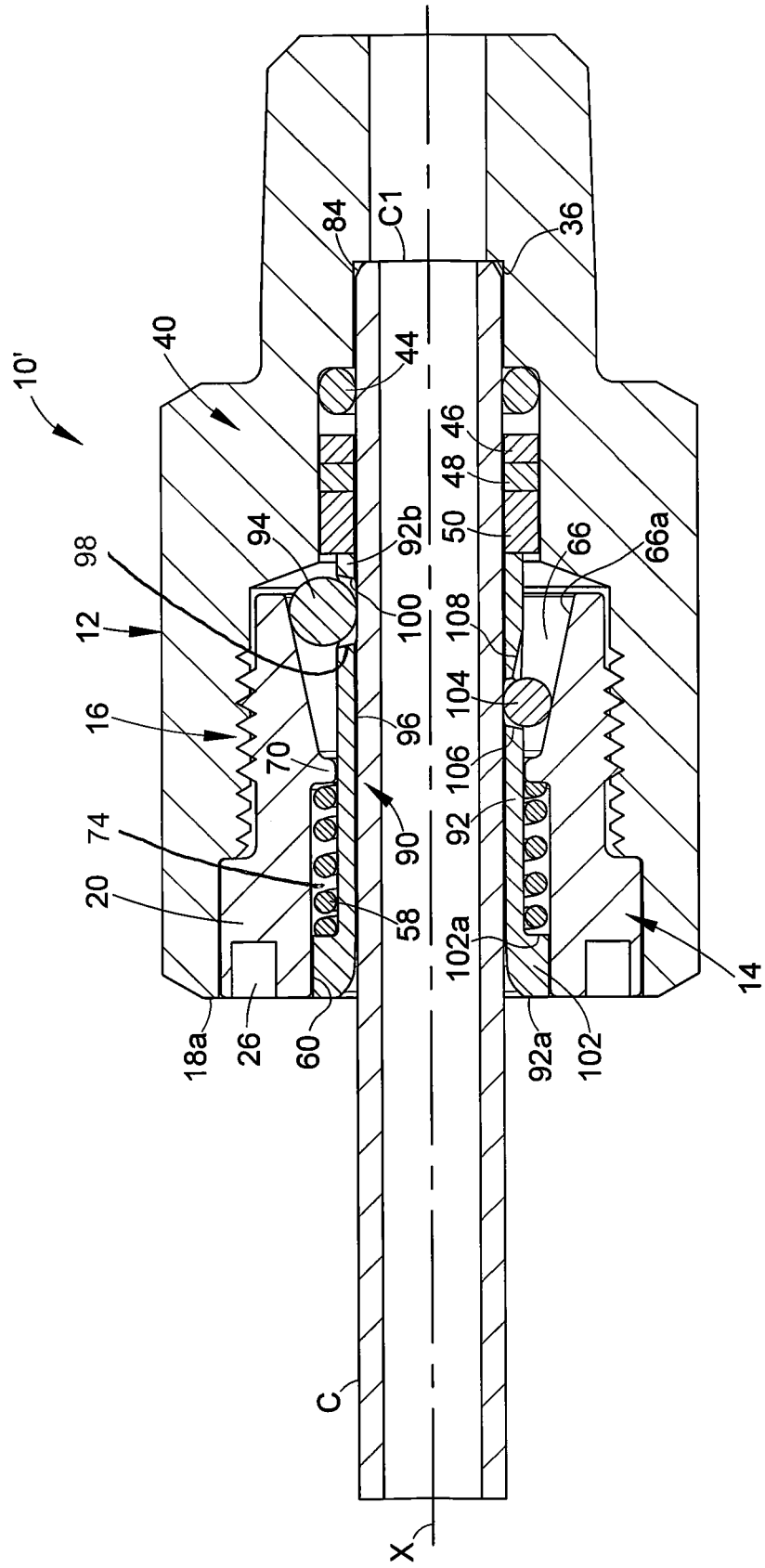
FIG. 8 is another embodiment of a fitting assembly in longitudinal section.
Figure 9:
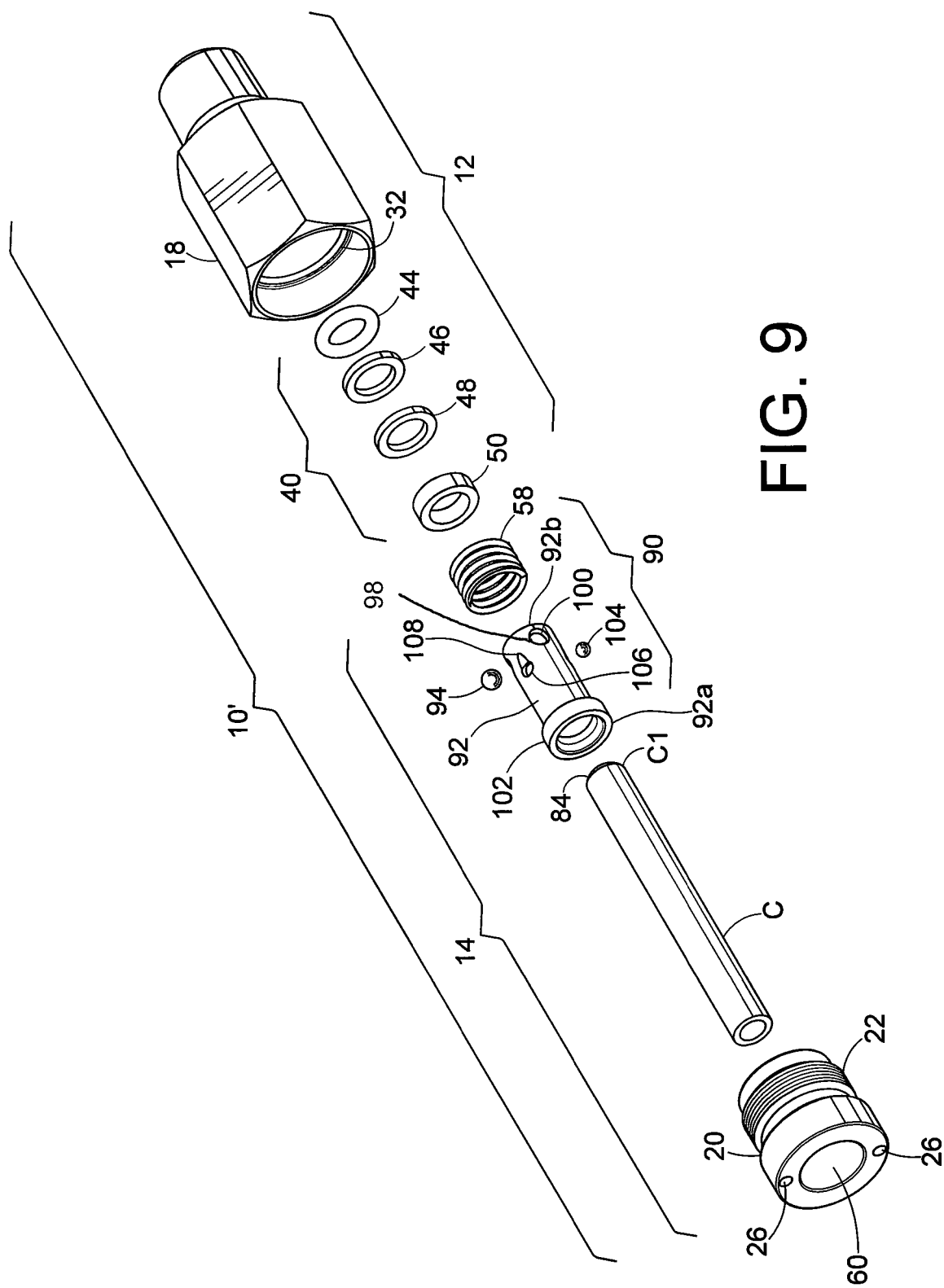
FIG. 9 is an exploded isometric of the fitting assembly of FIG. 8 including the conduit.

FIGS. 8 and 9 illustrate another embodiment of a single action push to connect conduit fitting 10'. In this embodiment, most of the components and parts of the fitting 10' may be but need not be the same as the embodiment of FIGS. 1-7 above. Therefore, like reference numerals are used for like parts and the description of the parts need not be repeated. Note again that although the conduit C is shown in FIG. 9, the conduit C is not considered to be part of the second fitting component 14.

The embodiment of FIGS. 8 and 9 differs from the embodiments described above in the design of the retainer 90. In an embodiment, the retainer 90 may be a subassembly comprising a ball cage 92, a conduit gripping member 94 and the biasing member 58. Although the ball cage 92 and the conduit gripping member 94 are shown as two distinct parts, alternatively other retainer designs may be used that would integrate this functionality into a single part, further optionally including the functionality of the biasing member 58. The conduit gripping member 94 may be realized in the form of a first set of one or more preferably spherical balls 94, although other conduit gripping member designs may alternatively be used as needed. The ball cage 92 may be adapted to move or shift axially within a central bore 60 of the nut 20. The ball cage 92 includes a through bore 96 that admits insertion of the conduit C into the fitting assembly 10'. An inward end portion 92b of the ball cage 92 includes one or more ball cavities 98 that position or trap the balls 94 within a preferably tapered wall cavity 66 of the nut 20. Note that in FIGS. 8 and 9 for clarity we only show one conduit gripping member or ball 94, but in practice there may be a ball 94 in each ball cavity 98 or fewer balls 94 may be used, although preferably there will be at least three balls used. Each ball cavity 98 may include a beveled or shaped ball cavity wall 100 that may be sized and beveled or shaped to prevent the associated ball 94 from falling through the ball cavity 98. However, each ball cavity 98 is preferably sized so that at least a portion of each ball 94 protrudes through the associated ball cavity 98 so as to make contact with the conduit C outer surface.

The central bore 60 of the nut 20 may include a radially inward projecting rib 70 and the outboard end 92a of the ball cage 92 may include a radially outwardly projecting flange 102 that presents an inner surface 102a that faces towards the rib 70. The flange 102 and the rib 70 along with the central bore 60 of the nut 20 define a slot 74 that receives the biasing member 58. The biasing member 58 may be realized in the form of a coiled spring as shown, however, many other types of biasing members may alternatively be used. The spring or biasing member 58 is compressed in the slot 74 so as to apply an outwardly directed axial force on the ball cage 92. By outwardly is meant in an axial direction away from the conduit end C1. The ball cage 92 is able to move or shift axially although the movement or shift may be slight and perhaps imperceptible by visual or tactile feedback. The axial bias produced by the spring 58 pulls the bills 94 that sit in the ball cavities 98 in towards the radially narrower portion of the tapered wall cavity 66 such that the balls 94 engage the tapered wall 66a and are trapped against the tapered wall 66*a* because of the limited radial movement permitted by the ball cavities 98. The trapped balls 94 thus also prevent the spring 58 from pushing the ball cage 92 out through the nut central bore 60.

It will be noted that the amount of axial movement or shift of the ball cage 92 will be a function of a number of design factors including the size of the balls 94 relative to the size of the tapered wall cavity 66. The biasing member 58 thus serves to maintain the retainer 90 with the nut 20 as a complete subassembly of the second fitting component 14.

The retainer 90 further includes a second set of preferably spherical balls 104 although other shapes may be used as needed. The second set of spherical balls 104 are preferably smaller in size than the first set of spherical balls 94. The ball cage 92 further includes a second set of ball cavities 106. The second set of ball cavities 106 and the balls 104 may be evenly spaced circumferentially from each other in the ball cage 92 so as to reduce potential damage to the conduit C caused by vibration and oscillation of the conduit. As with the first set of balls 94 that are used for the conduit gripping device, an even or uneven number of balls 104 may be used. A benefit of an uneven number of balls 104 is that no two balls will be diametrically opposed to each other when the balls 104 are in position in the ball cage 92.

The second set of balls 104 are preferably spaced axially outwardly from the first set of balls 94. The idea is to have the second set of balls 104 also be trapped between the tapered wall 66*a* and the conduit C so as to add rigidity and stiffness to the support of the conduit C, somewhat akin to using two bearings spaced apart to support a rotating shaft. By having the second ball set 104 smaller in diameter than the first ball set 94, the same tapered wall 66 cavity may be used to retain the ball sets and still have the second ball set 104 axially spaced from the first ball set 94. An alternative embodiment may use two discontinuous tapered surfaces for the two ball sets, or other structures by which the second ball set 104 is trapped between the nut 20 and the conduit C.

The amount of axial separation provided between the first ball set 94 and the second ball set 104 will be based on various factors including but not limited to the loads that are expected on the conduit C and the amount of flex and vibration to which the conduit C may be exposed in use. The second ball set 104 is preferably axially spaced outwardly from the first ball set 94, in a direction away from the conduit end C1. Thus, the second ball set 104 helps to isolate the conduit gripping first ball set 94 from conduit vibration and rotary flex and other environmental stresses that the conduit C may experience during use. In order to help assure that the second ball set 104 makes contact with the tapered wall 66*a* and the conduit C when the first ball set 94 does the same, the tolerances may be chosen so that during assembly and under the biasing influence of the biasing member 58 on the ball cage 92, the first ball set 94 contacts the tapered wall 66*a* first or before the second ball set 104 would make such contact. The first ball set 94 indents slightly into the outer surface of the conduit C, which produces enough axial shift of the ball cage 92 to allow the second ball set 104 to also make contact with the tapered wall 66*a*.

As an example, for conduit C, nut 20 and balls 94 made of 316L stainless steel, and quarter-inch nominal outer diameter conduit and nominal wall thickness of 0.035 in., the first ball set 94 may indent into the conduit surface in the range of approximately 0.003 in to 0.004 in and up to approximately 0.008 in. These numbers and ranges are exemplary of course because the actual numbers will be adjusted based on materials used for the retainer parts and the conduit, conduit wall thickness, diameters and so on. The conduit gripping member 56 in the first embodiment (FIGS. 1-7) and the conduit gripping member 94 of the second embodiment (FIGS. 8 and 9) may use this indentation feature into the conduit C outer surface to enhance the ability of the retainer 52/90 to grip and hold the conduit C over and above the friction forces that also work to retain the conduit C, advantageously when the conduit C is under pressure. For embodiments that use two ball sets, the second ball set 104 may also contribute to conduit grip by also indenting into the conduit C outer surface, although this is more likely to be the case under elevated pressures. Conduit grip by the second ball set 104 may be a benefit realized in some designs and applications, but the first ball set 94 preferably is designed to provide sufficient and primary conduit grip and retention, while the second ball set 104 preferably is designed to provide isolation of conduit vibration and flex from the first ball set 94.

From FIG. 9 it will be noted that each ball cavity 98 may include an axially extending relief or groove 108. During assembly of the retainer 90 into the nut 20, due to the limited axial movement of the ball cage 92 resulting from the flange 102 contacting the rib 70, it may be in some cases that the ball cage 92 can only extend just far enough to partially expose the ball cavities 98 to allow the balls 94 to be positioned into the ball cavities 98. The relief or groove 108 allows sufficient room or gap between the tapered wall 66*a* and the ball cage 92 to allow the second ball set 104 to be assembled into the ball cage 92.

Assembly and operation of the single action push to connect fitting 10' of the alternative embodiment of FIGS. 8 and 9 may be though need not be the same as the first fitting 10 embodiment of FIGS. 1-7 and therefore the description need not be repeated.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A fitting assembly for conduit with the conduit having a longitudinal axis, comprising:
   a fitting body that is adapted to receive a conduit end;
   a seal device disposed in said fitting body that seals against an outer surface of a conduit when the conduit is inserted into said fitting body;
   a fitting nut that is adapted to be joined to said fitting body;
   a retainer at least partially disposed within said fitting nut, the retainer including an outboard end portion and an inward end portion, wherein said retainer comprising a conduit gripping member that grips an outer surface of the conduit when said retainer is in a first axial position in said fitting assembly, said conduit gripping member releasing grip of the conduit when said retainer is in a second axial position in said fitting assembly that is different from said first axial position; and
   a biasing member that applies an outward biasing force to the outboard end portion of the retainer;
   wherein the inward end portion of the retainer is engageable with the seal device, such that under fluid pressure the seal device applies an axial force against the inward end portion of the retainer toward gripping engagement with the conduit.

2. The fitting assembly of claim 1 wherein said seal device comprises elastomeric material.

3. The fitting assembly of claim 1 wherein said conduit gripping member comprises one or more spheres or balls.

4. The fitting assembly of claim 3 wherein said retainer comprises a ball cage that positions said conduit gripping member in said fitting nut.

5. The fitting assembly of claim 1 wherein said biasing member comprises a coil spring, a wave spring, or a Belleville spring.

6. The fitting assembly of claim 1 wherein said fitting nut comprises a tapered surface that engages said conduit gripping member when said retainer is in said first axial position.

7. The fitting assembly of claim 1 wherein said retainer comprises a cylindrical through bore that admits insertion of the conduit.

8. The fitting assembly of claim 7 wherein said cylindrical through bore is delimited by a wall comprising a cylindrical portion and a tapered portion.

9. The fitting assembly of claim 1 wherein said retainer applies a retaining force to the conduit to constrain axial movement of the conduit, wherein when the fitting assembly is under fluid pressure said retaining force increases.

10. The fitting assembly of claim 1 wherein said seal device is axially positioned at a first side of said retainer that is axially opposite a second side of said retainer, wherein the conduit is inserted into the fitting assembly through said second side of said retainer.

11. A fitting assembly for conduit with a longitudinal axis, comprising:
a first fitting component that is adapted to receive a conduit end;
a seal device disposed in said first fitting component that seals against an outer surface of a conduit when the conduit is inserted into the first fitting component;
a second fitting component that is adapted to be joined to said first fitting component, the second fitting component comprising a retainer for gripping the conduit when the conduit is inserted into said second fitting component, the retainer including an outboard end portion and an inward end portion; and
a biasing member that applies an outward biasing force to the outboard end portion of the retainer
wherein said retainer applies a retaining force to an outer surface of the conduit when said retainer is in a first axial position in said fitting assembly, said retainer releasing said retaining force when said retainer is in a second axial position in said fitting assembly that is different from said first axial position;
wherein the inward end portion of the retainer is engageable with the seal device, such that under fluid pressure the seal device applies a fluid pressure driven axial force against the inward end portion of the retainer toward gripping engagement with the conduit.

12. The fitting assembly of claim 11 wherein said retainer comprises a ball cage and one or more conduit gripping balls and said seal device comprises an o-ring.

13. The fitting assembly of claim 11 wherein said seal device comprises elastomeric material.

14. The fitting assembly of claim 11 wherein said retainer comprises a conduit gripping member.

15. The fitting assembly of claim 14 wherein said conduit gripping member comprises one or more spheres or balls.

16. The fitting assembly of claim 14 wherein said retainer comprises a ball cage that positions said conduit gripping member in said second fitting component.

17. The fitting assembly of claim 11 wherein said biasing member comprises a coil spring, a wave spring, or a Belleville spring.

18. The fitting assembly of claim 14 wherein said second fitting component comprises a tapered surface that engages said conduit gripping member when said retainer is in said first axial position.

19. The fitting assembly of claim 11 wherein said retainer comprises a cylindrical through bore that admits insertion of the conduit.

20. The fitting assembly of claim 19 wherein said cylindrical through bore is delimited by a wall comprising a cylindrical portion and a tapered portion.

* * * * *